(12) United States Patent
Ishida

(10) Patent No.: US 10,032,278 B2
(45) Date of Patent: Jul. 24, 2018

(54) VEHICLE POSITION ESTIMATION DEVICE, METHOD AND COMPUTER READABLE RECORDING MEDIUM

(71) Applicant: KABUSHIKI KAISHA TOYOTA CHUO KENKYUSHO, Nagakute-shi, Aichi-ken (JP)

(72) Inventor: Hiroyuki Ishida, Nagakute (JP)

(73) Assignee: KABUSHIKI KAISHA TOYOTA CHUO KENKYUSHO, Nagakute (JP)

(*) Notice: Subject to any disclaimer, the term of this patent is extended or adjusted under 35 U.S.C. 154(b) by 0 days.

(21) Appl. No.: 14/924,298

(22) Filed: Oct. 27, 2015

(65) Prior Publication Data
US 2016/0140718 A1 May 19, 2016

(30) Foreign Application Priority Data
Nov. 19, 2014 (JP) ................................ 2014-234988

(51) Int. Cl.
*G06T 7/00* (2017.01)
*G06K 9/00* (2006.01)
(Continued)

(52) U.S. Cl.
CPC ........ *G06T 7/0044* (2013.01); *G06K 9/00791* (2013.01); *G06T 7/74* (2017.01);
(Continued)

(58) Field of Classification Search
None
See application file for complete search history.

(56) References Cited

U.S. PATENT DOCUMENTS 5,613,055 A * 3/1997 Shimoura .............. G01C 21/26
340/995.2
8,612,135 B1 12/2013 Montemerlo et al.
(Continued)

FOREIGN PATENT DOCUMENTS

JP 2005-265494 A 9/2005
JP 2005-326168 A 11/2005
(Continued)

OTHER PUBLICATIONS

Jan. 10, 2017 Office Action issued in Japanese Patent Application No. 2014-234988.

*Primary Examiner* — Said Broome
(74) *Attorney, Agent, or Firm* — Oliff PLC

(57) ABSTRACT

Sensor information acquisition section acquires surrounding information including three dimensional information of respective surrounding positions of subject vehicle, and positional information of subject vehicle. Road surface information extraction section generates road surface image in which acquired surrounding information is projected onto road surface on which subject vehicle is travelling. Environment image generation section generates environment image in which three dimensional information of respective surrounding positions included in surrounding information has been appended to positions corresponding to surrounding positions in generated road surface image. Based on acquired positional information of subject vehicle, stored image acquisition section acquires stored image corresponding to positional information of subject vehicle from database. Image matching section matches generated environment image against acquired stored image. Estimation section estimates amount of displacement in positional information of subject vehicle based on obtained matching result.

5 Claims, 13 Drawing Sheets

(51) Int. Cl.
  *G06T 15/04* (2011.01)
  *H04N 13/204* (2018.01)
  *G06T 7/73* (2017.01)
  *H04N 13/239* (2018.01)
  *G06K 9/52* (2006.01)
  *H04N 13/00* (2018.01)

(52) U.S. Cl.
  CPC ........... *G06T 15/04* (2013.01); *H04N 13/204* (2018.05); *H04N 13/239* (2018.05); *G06K 9/00201* (2013.01); *G06K 9/522* (2013.01); *G06T 2207/10028* (2013.01); *G06T 2207/20056* (2013.01); *G06T 2207/30252* (2013.01); *H04N 2013/0081* (2013.01); *H04N 2013/0088* (2013.01); *H04N 2013/0092* (2013.01)

(56) References Cited

U.S. PATENT DOCUMENTS

| 9,395,192 | B1* | 7/2016 | Silver | G06K 9/00798 |
| 2004/0049341 | A1* | 3/2004 | Fujiwara | G01C 21/3638 |
| | | | | 701/436 |

FOREIGN PATENT DOCUMENTS

| JP | 2007-147564 A | 6/2007 |
| JP | 2008-298697 A | 12/2008 |
| JP | 2011-008320 A | 1/2011 |

\* cited by examiner

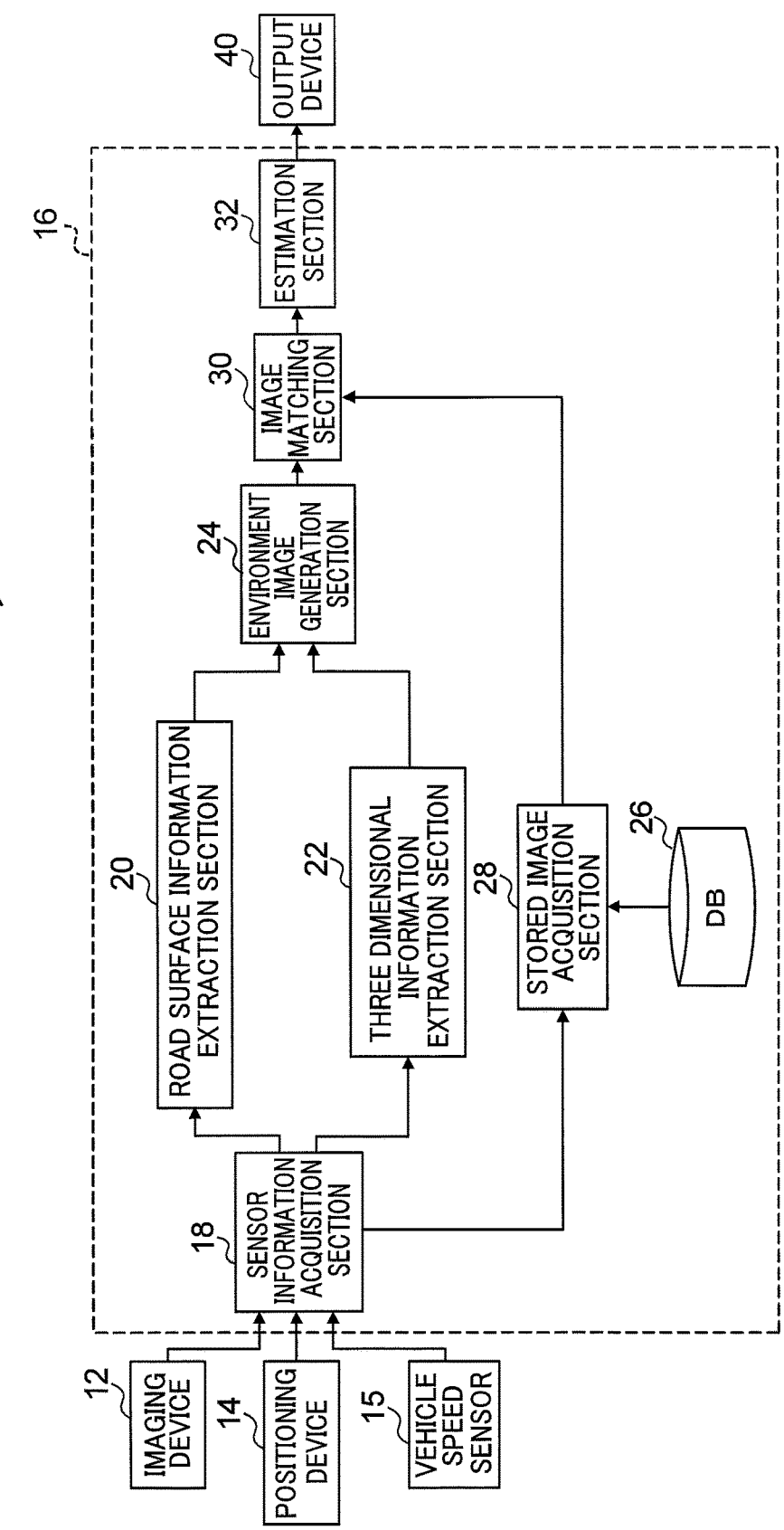

ROAD SURFACE COORDINATES
(TOP VIEW)

PROJECTION FROM IMAGE COORDINATES
TO ROAD SURFACE COORDINATES

EDGES OF PILLAR
SHAPED OBJECT

PART OF
SURROUNDINGS IMAGE

REAL COMPONENT OF
ENVIRONMENT IMAGE

CARICATURIZED PILLAR
SHAPED OBJECT

IMAGINARY COMPONENT OF
ENVIRONMENT IMAGE

VEHICLE POSITION ESTIMATION DEVICE, METHOD AND COMPUTER READABLE RECORDING MEDIUM

CROSS-REFERENCE TO RELATED APPLICATION

This application is based on and claims priority under 35 USC 119 from Japanese Patent Application No. 2014-234988 filed Nov. 19, 2014.

TECHNICAL FIELD

The present invention relates to a vehicle position estimation device and a computer readable recording medium.

RELATED ART

Hitherto, a vehicle position estimation device is known that extracts vehicle lane information and landmark information from an image captured by an onboard camera, estimates a vehicle position by matching the image against a map, and finds the vehicle position from the cumulative vehicle speed at locations where no map information exists (for example, see Japanese Patent Application Laid-Open (JP-A) No. 2005-265494).

Moreover, an image recognition device is known that employs plural front and rear cameras to recognize a road surface and features, and estimates the vehicle position by matching positions against a database (for example, see JP-A No. 2007-147564).

Moreover, an own-position estimation device is known that acquires three dimensional data regarding the surrounding environment, and estimates an own-position by matching point group data such as wall surfaces against a database using an iterative closest point (ICP) algorithm (for example, see JP-A No. 2011-8320).

SUMMARY OF INVENTION

Technical Problem

In the technology described in JP-A No. 2005-265494, vehicle lane and landmark information are matched against a map, and utilized for vehicle position correction. However, although most of the information regarding the surrounding environment, such as the vehicle lanes, can be utilized for correcting positional displacement in the left-right direction, there are few clues suitable for correcting front-rear direction positional displacement. Accordingly, there is a tendency for front-rear direction positional displacement to be large when the surrounding environment is utilized unmodified.

Moreover, in the technology described in JP-A No. 2007-147564, although results of detecting specific objects are utilized, it is possible that positional displacement arises due to false detection, missed detection, or miscategorization.

Moreover, in the technology described by JP-A No. 2011-8320, although matching is made using an ICP algorithm for three dimensional point groups, point group data acquired from stereo cameras and the like is liable to be affected by noise, and stable elimination of outliers is difficult due to the presence of plants and moving objects.

The present invention has been arrived at in consideration of the above circumstances.

SUMMARY

According to a first aspect of the invention, a vehicle position estimation device is configured including: an information acquisition unit that acquires surrounding information including three dimensional information of respective surrounding positions of a subject vehicle, and acquires positional information of the subject vehicle; a road surface information extraction unit that generates a road surface image in which the surrounding information acquired by the information acquisition unit is projected onto a road surface along which the subject vehicle is travelling; an environment image generation unit that generates an environment image in which the three dimensional information of the respective surrounding positions included in the surrounding information has been appended to positions corresponding to the surrounding positions in the road surface image generated by the road surface information extraction unit; a stored image acquisition unit that, based on the positional information of the subject vehicle acquired by the information acquisition unit, acquires the stored image corresponding to the positional information of the subject vehicle from a database pre-stored with stored images that are road surface images corresponding to respective positional information of the vehicle and that are road surface images to which three dimensional information has been appended to respective positions; an image matching unit that matches the environment image generated by the environment image generation unit against the stored image acquired by the stored image acquisition unit; and an estimation unit that estimates the amount of displacement in the positional information of the subject vehicle based on the matching result obtained by the image matching unit.

BRIEF DESCRIPTION OF THE DRAWINGS

Exemplary embodiments of the present invention will be described in detail based on the following figures, wherein:

FIG. 1 is a block diagram illustrating a vehicle position estimation device according to a first exemplary embodiment;

DETAILED DESCRIPTION

Figure 2A:
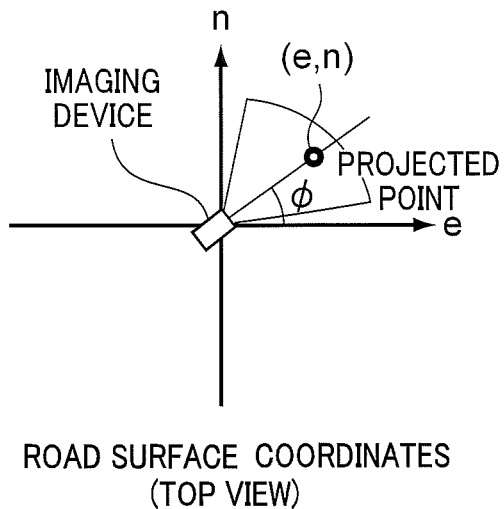
FIGS. 2A and 2B are diagrams for explaining generation processing for a road surface image.

Detailed description follows regarding an exemplary embodiment, with reference to the drawings.

In the present exemplary embodiment, explanation follows of an example of a vehicle position estimation device that estimates the position of a subject vehicle.

Examples of road surface information, serving as a clue for correcting the position of the subject vehicle when the position of the subject vehicle is estimated using the vehicle position estimation device, include lane markings. However, only the left-right direction component of any positional displacement can be corrected using line segments of lane markings. Accordingly, information in the environment surrounding the subject vehicle is not necessarily suitable for vehicle position estimation.

Moreover, it is necessary to deliberately generate clues suitable for front-rear direction position alignment in order to appropriately perform position alignment in the front-rear direction, and not just the left-right direction. Although methods that utilize three dimensional information are widely utilized, such as point groups for front-rear direction position alignment, these are liable to be affected by moving objects, seasonal changes in plants, and the like in the surroundings.

Accordingly, in the present exemplary embodiment, both three dimensional information and road surface information are utilized to estimate the position of the subject vehicle.

First Exemplary Embodiment

Configuration of Vehicle Position Estimation Device 10 According to First Exemplary Embodiment As illustrated in FIG. 1, a vehicle position estimation device 10 according to a first exemplary embodiment is configured including an imaging device 12 that outputs an image captured of in front of the subject vehicle including a roadway region, a positioning device 14 that measures positional information of the subject vehicle, a vehicle speed sensor 15 that measures the speed of the subject vehicle, a computer 16 that executes processing to estimate the position of the subject vehicle based on the image obtained from the imaging device 12 and the positional information obtained from the positioning device 14 of the subject vehicle, and an output device 40 that outputs positional information of the subject vehicle estimated by the computer 16.

The imaging device 12 is mounted to the vehicle, successively captures images in front of the subject vehicle including the roadway region, and outputs images of in front of the subject vehicle. In the first exemplary embodiment, explanation follows regarding an example of a case in which the imaging device 12 is configured using a stereo camera. The imaging device 12 includes, for example, two onboard cameras, and outputs an image captured by a left onboard camera and an image captured by a right onboard camera. The imaging device 12 captures images in front of the subject vehicle, and includes two imaging sections (not illustrated in the drawings) that generate image signals of images, an A/D conversion section (not illustrated in the drawings) that A/D converts the image signals generated by the two imaging sections, and image memory (not illustrated in the drawings) for temporarily storing the A/D converted image signals.

The positioning device 14 is configured using, for example, a GPS sensor, and successively measures positional information of the subject vehicle.

The computer 16 is configured including a CPU, RAM, ROM storing a program for executing a vehicle position estimation processing routine described below, and a bus that connects these together. When the computer 16 is explained using functional blocks divided by function implementation means defined on the basis of hardware and software, the computer 16 may be represented by a configuration including a sensor information acquisition section 18, a road surface information extraction section 20, a three dimensional information extraction section 22, an environment image generation section 24, a database 26, a stored image acquisition section 28, an image matching section 30, and an estimation section 32. The sensor information acquisition section 18 and the three dimensional information extraction section 22 are examples of information acquisition units.

The sensor information acquisition section 18 acquires the respective left and right images captured by the imaging device 12. Moreover, the sensor information acquisition section 18 acquires the positional information of the subject vehicle measured by the positioning device 14, and the speed of the subject vehicle measured by the vehicle speed sensor 15.

Figure 2B:
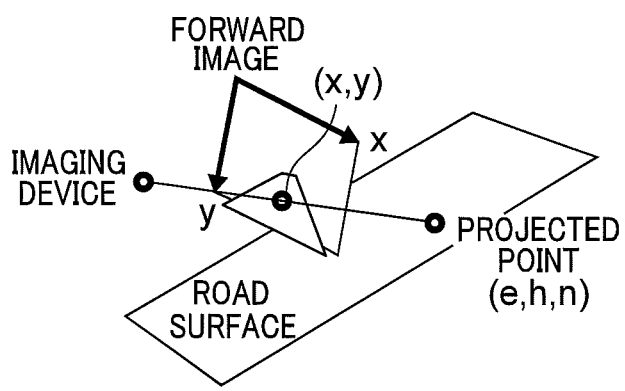

The road surface information extraction section 20 generates a road surface image in which the images acquired by the sensor information acquisition section 18 are projected onto the road surface on which the subject vehicle is travelling. FIGS. 2A and 2B are diagrams for explaining the generation process for the road surface image.

Specifically, as illustrated in FIG. 2B, the road surface information extraction section 20 converts image coordinates in the images captured by the imaging device 12 into road surface coordinates, and generates a road surface image based on the road surface coordinates illustrated in FIG. 2A. Explanation follows regarding a method for coordinate-converting images and generating road surface images. Note that in the present exemplary embodiment, explanation follows regarding an example in which a road surface image is generated from an image captured by either one out of the two onboard cameras provided to the imaging device 12.

The onboard cameras of the imaging device 12 are pre-calibrated using the method of Reference Document 1 (Z. Zhang, "A Flexible New Technique for Camera Calibration", IEEE Transactions on Pattern Analysis and Machine Intelligence, 22 (11), p. 1330-1334, 2000), and find an internal parameter matrix A and an external parameter matrix [R|t]. When the direction of the subject vehicle (yaw angle) obtained from the positional information of the subject vehicle acquired by the sensor information acquisition section 18 is denoted φ (in rad), a scale variable is denoted s, and the height of the installation position of the onboard camera is denoted h (in m), the relationship between positions (e, n) (in m) in real space and positions (x, y) (by pixel) in the image is given by Equation (1) below.

$$s \begin{bmatrix} x \\ y \\ 1 \end{bmatrix} = A[R|t] \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix} \begin{bmatrix} e \\ h \\ n \\ 1 \end{bmatrix} \quad (1)$$

The road surface information extraction section 20 finds real positions for pixels in the image using Equation (1) above and the positional information of the subject vehicle acquired by the sensor information acquisition section 18, and generates a road surface image by projecting pixel values onto a grid in which the road surface is divided at specific intervals (for example, 5 cm squares) as illustrated in FIG. 2A and FIG. 2B.

Figure 3:
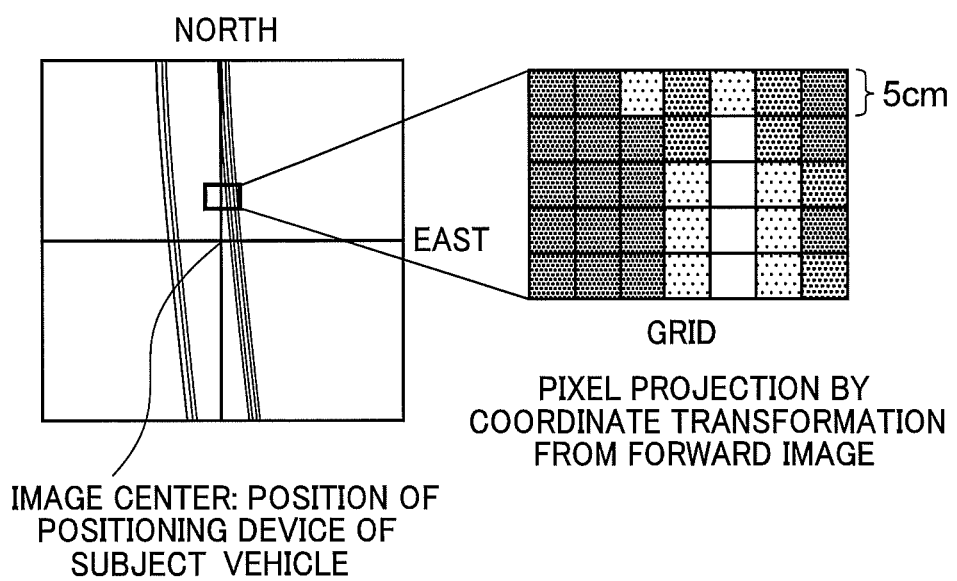
FIG. 3 is a diagram for explaining a relationship between a road surface image and a grid.

FIG. 3 illustrates an outline diagram to represent a relationship between the grid and the road surface image. The image at the right side of FIG. 3 represents the grid, and the image at the left side represents the road surface image. In FIG. 3, the right direction is east, and the upward direction is north. As illustrated in FIG. 3, one grid square corresponds to one pixel of the road surface image, and one square (one pixel) is, for example, 5 cm. Moreover, the positioning device 14 of the subject vehicle is positioned at the center of the road surface image.

As illustrated in FIG. 3, the road surface information extraction section 20 divides the road surface on which the subject vehicle is travelling into a grid of a specific interval, and generates a road surface image by projecting the pixel values of each pixel in the image onto the grid. When the three dimensional positions of the points in the image are the left-right position x, the up-down position y, and the depth direction position z, the grid lies in the (x, z) plane. Note that when pixels of points in the image are corresponded against the same grid, points observed at a close distance to the subject vehicle are considered to be highly reliable, and are given priority when recording on the grid.

Figure 4:
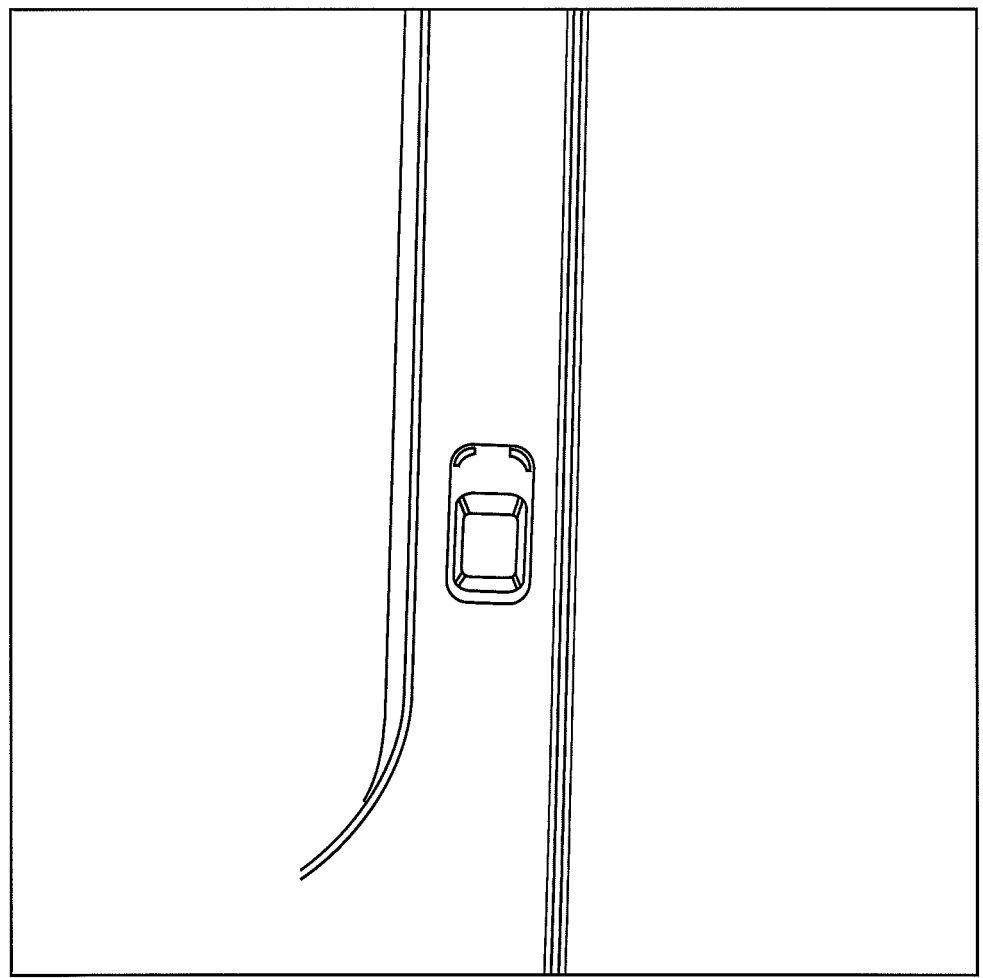
FIG. 4 is a diagram illustrating an example of a road surface image.

Moreover, the road surface information extraction section 20 generates road surface images based on the positional information of the subject vehicle and the speed of the subject vehicle acquired by the sensor information acquisition section 18. FIG. 4 illustrates an example of a road surface image generated by the road surface information extraction section 20. In FIG. 4, a road surface image has also been generated for rearward of the subject vehicle. After generating the road surface image in front of the subject vehicle by image converting the image captured by the imaging device 12 as explained above, the road surface information extraction section 20 stitches the road surface image generated at the previous timing together with the road surface image generated at the next timing, so as to generate a road surface image of rearward of the subject vehicle, based on the positional information of the subject vehicle and the speed of the subject vehicle acquired by the sensor information acquisition section 18.

The three dimensional information extraction section 22 extracts three dimensional information of the surrounding positions from the respective left and right images acquired by the sensor information acquisition section 18. Note that the three dimensional information of the surrounding positions is an example of surrounding information.

More specifically, the three dimensional information extraction section 22 extracts feature points from within the respective images imaged by the imaging device 12, and calculates the parallax between the image captured by the left onboard camera and the image captured by the right onboard camera. Moreover, based on the calculated parallax, the three dimensional information extraction section 22 then computes three dimensional positions (in actual space) for respective points (pixels) in the images captured by the imaging device 12. The parallax can be found by, for example, the method described by Reference Document 2 (A. Geiger, M. Roser and R. Urtasun, "Efficient large-scale stereo matching", Proceedings of Asian Conference on Computer Vision, Queenstown, New Zealand, November 2010) using a pre-calibrated camera. Moreover, the three dimensional positions of points in the images can be found by the method of Reference Document 3 (M. Bertozz, A. Broggi, "Stereo inverse perspective mapping: theory and applications", Image and Vision Computing, vol. 8, no. 16, p. 585-590, 1998).

For example, the depth direction z (in m) of a point is given by Equation (2) below wherein the parallax is denoted d (by pixel), the camera focal distance is denoted f (by pixel), and the inter-camera distance is denoted b (in m).

$$z = bf/d \qquad (2)$$

More specifically, the three dimensional information extraction section 22 records the three dimensional information of the respective points acquired using the stereo camera of the imaging device 12 in a grid format, similarly to the road surface image generated by the road surface information extraction section 20. Note that recording the three dimensional information of the respective points acquired using the stereo camera of the imaging device 12 in grid format may be recorded similarly to motion stereo (structure from motion) or three dimensional information measured by a laser.

The pixel values of the image captured by the imaging device 12 are recorded on a grid by the road surface information extraction section 20, and, for example, the three dimensional information extraction section 22 also records on the grid the height of the points in the road surface image (the up-down position y). When plural points are corresponded against the same grid, priority is given to recording of points at higher positions. For example, taking the example of a pillar shaped object, by recording points observed to be at a high position on the grid, information is expressed on the grid to indicate that a high pillar shaped object is present at that location.

The environment image generation section 24 appends the three dimensional information of the respective surrounding positions extracted by the three dimensional information extraction section 22 to positions corresponding to surrounding positions in the road surface image generated by the road surface information extraction section 20, and generates an environment image.

More specifically, the environment image generation section 24 embeds the three dimensional information extracted by the three dimensional information extraction section 22 into the road surface image. As the method of embedding the three dimensional information into the road surface image, the environment image generation section 24 takes the road surface image generated by the road surface information extraction section 20 as the real component of the environment image, takes the heights recorded by the three dimensional information extraction section 22 of the respective points in the road surface image as the imaginary component of the environment image, and generates an environment image in complex number format. A Fourier transform used in the matching processing of the image matching section 30, described below, is initially implemented in a complex number format. Using the imaginary component in the Fourier transform means that there is no degradation of the original road surface image. Moreover, there is no increase in the calculation cost for the matching. Furthermore, when a comparison is made between the method employed in the present exemplary embodiment against a method employing three dimensional point groups, the calculation cost can be suppressed due to being able to handle three dimensional information (for example, a solid object) in a frame group using two dimensional image matching (for example, without window scanning).

Stored images that are road surface images corresponded against respective vehicle positional information, appended with height information for each position, are pre-stored in a database 26. More specifically, each stored image is stored in the database 26 in a complex number format having the road surface image as the real component of the stored image, and the height of respective points in the road surface image as the imaginary component of the stored image. Thus the stored image includes not only the road surface image, but also the three dimensional information. Note that the stored images in the database 26 are accumulated in advance by the road surface information extraction section 20 and the three dimensional information extraction section 22 using a high precision positioning device. Positional information (for example, latitude information and longitude information) measured in advance using a high precision positioning device is appended to each position in the road surface image.

The stored image acquisition section 28 acquires the stored image corresponding to the positional information of the subject vehicle from the database 26 based on the positional information of the subject vehicle acquired by the sensor information acquisition section 18. The stored image acquisition section 28 acquires, from the database 26 that is constructed in advance, a stored image for referencing by the image matching section 30, described below.

Figure 5:
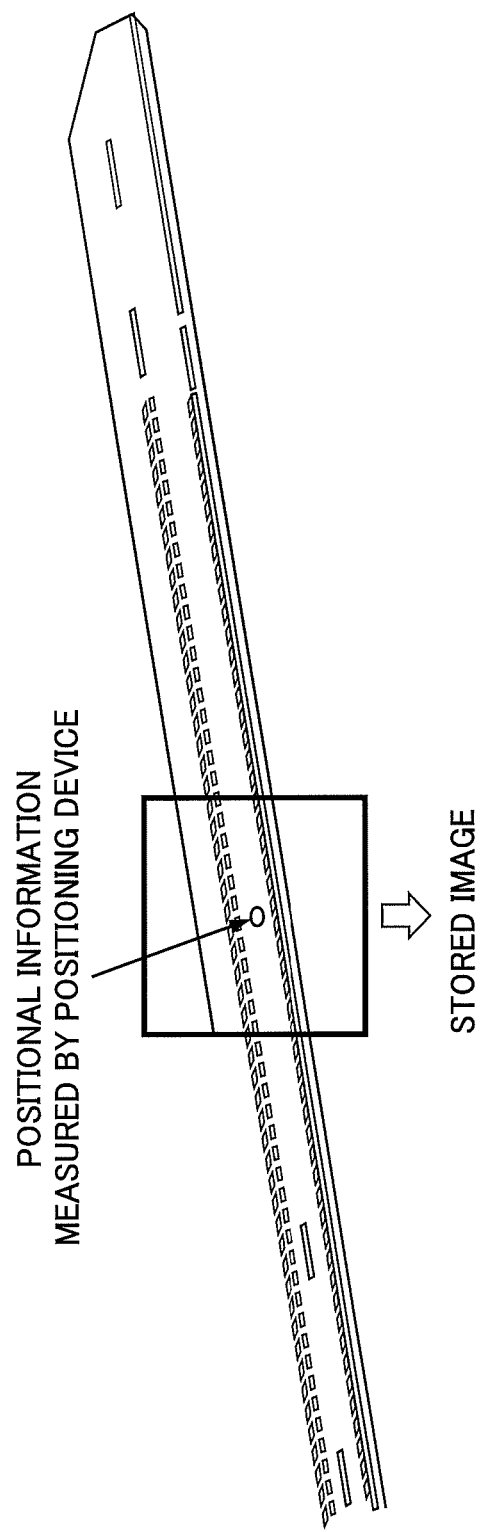
FIG. 5 is a diagram for explaining processing that acquires stored images from images stored in a database.

FIG. 5 illustrates processing for acquiring a road surface image included in a stored image of a reference target from positional information of the subject vehicle acquired by the sensor information acquisition section 18. As illustrated in FIG. 5, as the stored image corresponding to the positional information of the subject vehicle, the stored image acquisition section 28 acquires, for example, a square shaped area centered on positional information of the subject vehicle (for example, GPS observation values) acquired by the sensor information acquisition section 18.

The image matching section 30 matches the environment image generated by the environment image generation section 24 against the stored image acquired by the stored image acquisition section 28.

The image matching section 30 computes the amount of positional displacement of the subject vehicle by matching the environment image generated by the environment image generation section 24 against the stored image stored in the database 26. Note that the environment image is drawn such that the position of the positioning device 14 is at the center. The image positional displacement amount between the environment image and the stored image corresponds to the displacement between the position of the subject vehicle, as measured by the positioning device 14, and the actual position of the subject vehicle.

More specifically, the image matching section 30 performs a frequency conversion on the environment image generated by the environment image generation section 24 and the stored images acquired by the stored image acquisition section 28, and matches the environment image against the stored image by calculating the correlation between the frequency components of the environment image and the frequency components of the stored image according to Equation (3) below.

Figure 6:
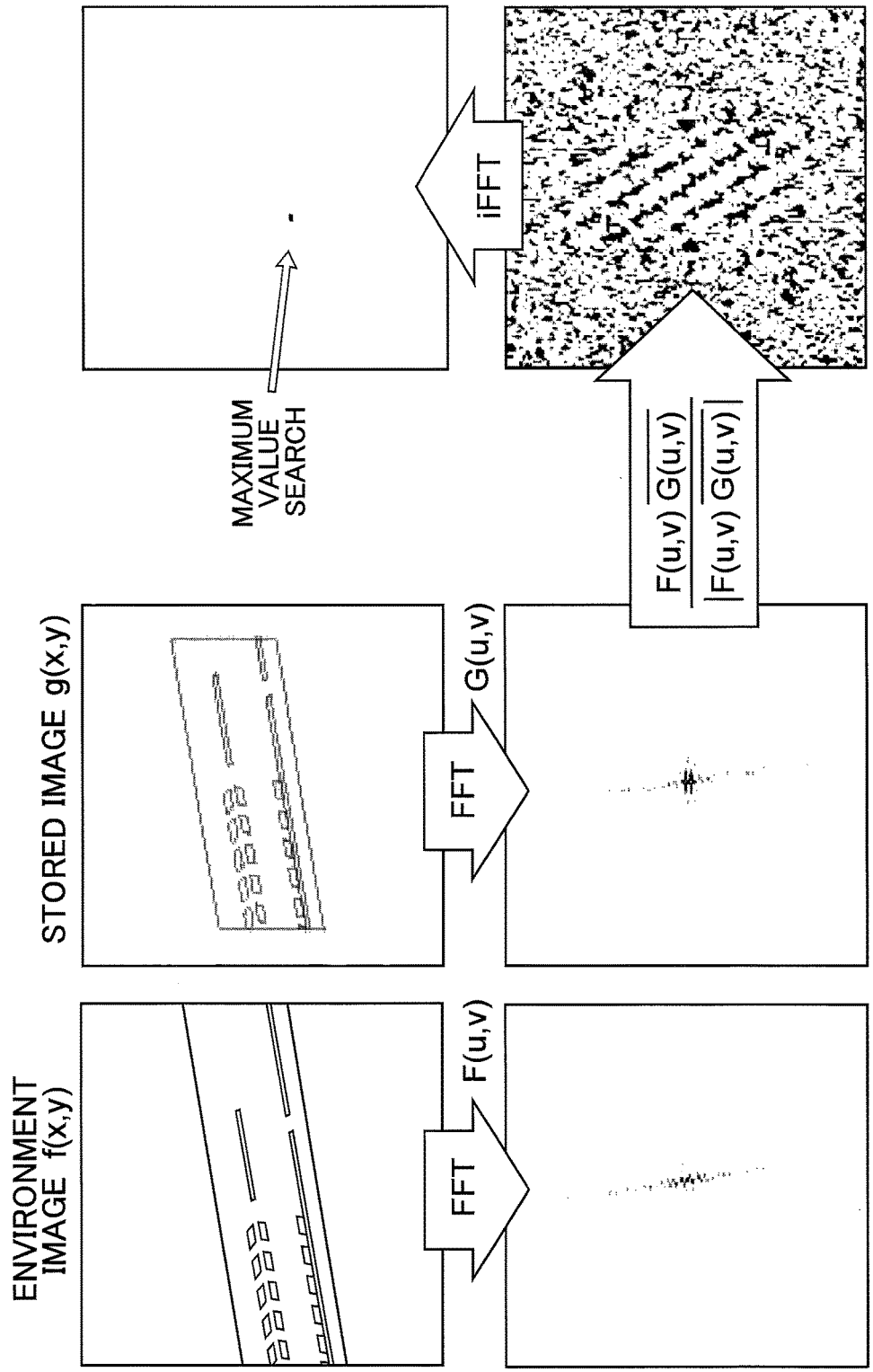
FIG. 6 is a diagram for explaining processing that matches an environment image against a stored image.

FIG. 6 is an illustrative diagram of processing for matching the environment image against the stored image.

As illustrated in FIG. 6, the image matching section 30 performs two dimensional Fourier transformation on both the stored image f (x, y) and the environment image g (x, y), and finds the frequency components F (u, v) of the stored image and the frequency components G (u, v) of the environment image. Next, the image matching section 30 calculates the correlation between the frequency components of the stored image and the frequency components of the environment image according to Equation (3) below for each (u, v), and generates a correlation image. Then, the image matching section 30 inverse Fourier transforms the generated correlation image. Note that FFT in FIG. 6 stands for fast Fourier transform, and iFFT stands for inverse fast Fourier transform. Moreover, the overline in Equation (3) represents the complex conjugate.

$$\frac{F(u, v)\overline{G(u, v)}}{|F(u, v)\overline{G(u, v)}|} \qquad (3)$$

The estimation section 32 estimates the amount of displacement in the positional information of the subject vehicle measured by the positioning device 14 based on the result of matching obtained by the image matching section 30.

More specifically, the estimation section 32 finds the position (x, y) at which the absolute value of the correlation image obtained by Equation (3) is at a maximum based on the matching result computed by the image matching section 30, and takes that position as the amount of positional displacement of the subject vehicle measured by the positioning device 14. Note that the estimation section 32 can also estimate the amount of positional displacement in sub-pixel units using the method described by Reference Document 4 (Takafumi Aoki et al., "High Accuracy Machine Vision Using Phase-Only Correlation-Toward Image Sensing Technology, Breaking the Limit of Pixel Resolution", IEICE Fundamentals Review, vol. 1, no. 1, p. 30-40, 2007).

Moreover, when the estimation section 32 implements a sub-pixel precision positional displacement calculation performed after lowering the resolution of the road surface image (shrinking to ¼ such that one pixel=20 cm) as required, this is also effective for reducing the amount of calculation.

Moreover, the estimation section 32 estimates the position of the subject vehicle based on the estimated amount of positional displacement of the subject vehicle, and positional information of the subject vehicle measured by the positioning device 14.

The output device 40 outputs the position of the subject vehicle estimated by the estimation section 32.

Figure 7:
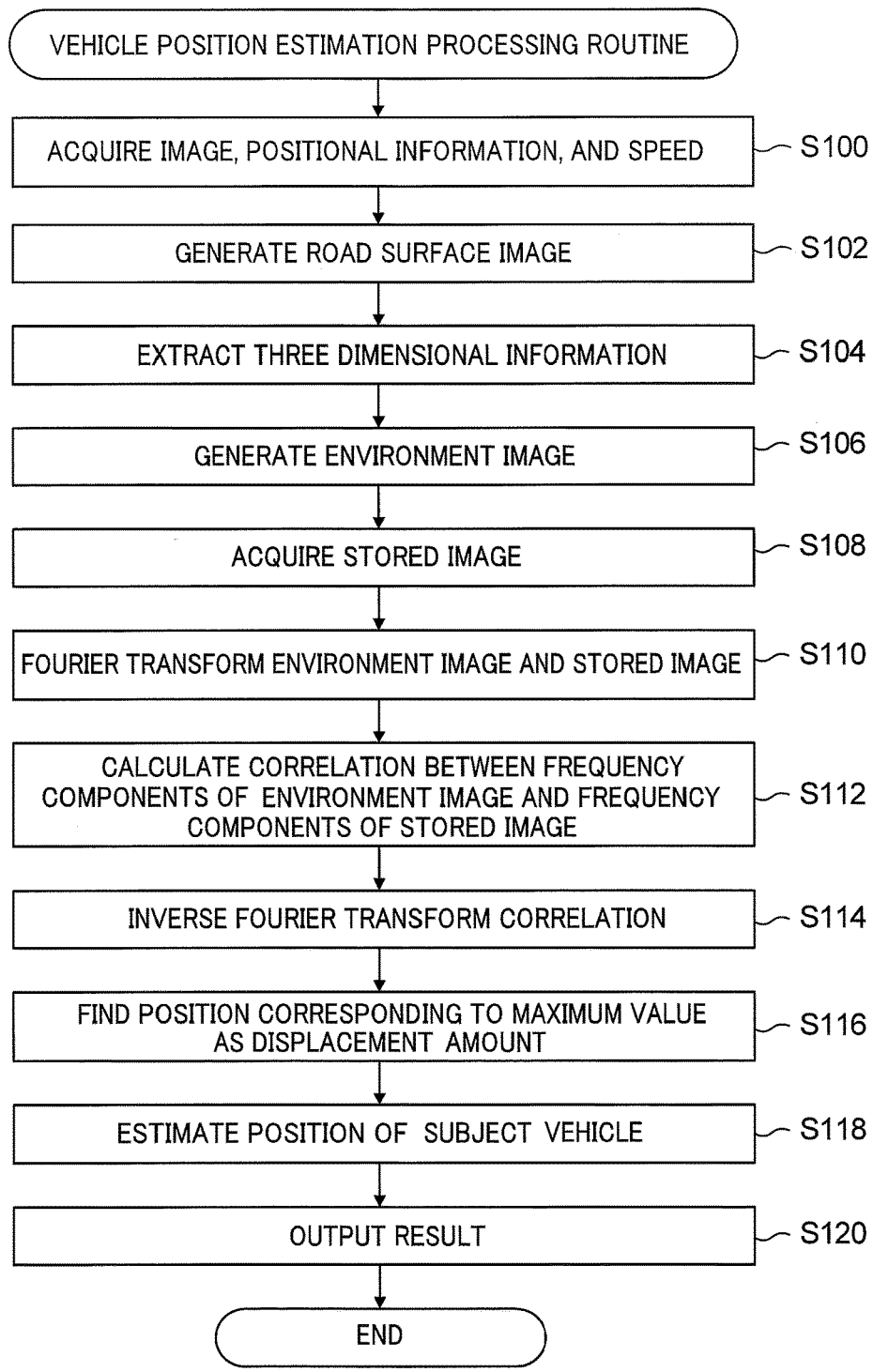
FIG. 7 is a flowchart illustrating contents of a vehicle position estimation processing routine of a vehicle position estimation device according to the first exemplary embodiment.

Operation of Vehicle Position Estimation Device 10 According to the First Exemplary Embodiment Next, explanation follows regarding operation of the vehicle position estimation device 10 according to the first exemplary embodiment. First, when the imaging device 12 starts capturing images in front of the subject vehicle, the vehicle position estimation processing routine illustrated in FIG. 7 is repeatedly executed by the computer 16.

At step S100, the sensor information acquisition section 18 acquires the respective left and right images captured by the imaging device 12, the position information of the subject vehicle measured by the positioning device 14, and the speed of the subject vehicle measured by the vehicle speed sensor 15.

At step S102, the road surface information extraction section 20 generates the road surface image in which the image acquired at step S100 above is projected onto the road surface on which the subject vehicle is travelling.

At step S104, the three dimensional information extraction section 22 extracts three dimensional information for respective surrounding positions from the left and right images acquired at step S100 above.

At step S106, the environment image generation section 24 generates the environment image in which the three dimensional information for the respective surrounding positions extracted at step S104 are appended to positions corresponding to the surrounding positions in the road surface image generated at step S102 above.

Then, at step S108, the stored image acquisition section 28 acquires, from the database 26, the stored image corresponding to the positional information of the subject vehicle based on the positional information of the subject vehicle acquired at step S100 above.

Next, at step S110, the image matching section 30 Fourier transforms both the environment image generated at step S106 above, and the stored image acquired at step S108 above.

At step S112, based on the transformation result obtained at step S110 above, the image matching section 30 calculates the correlation between the frequency components of the environment image and the frequency components of the stored image according to Equation (3) above, and generates a correlation image.

At step S114, the image matching section 30 inverse Fourier transforms the correlation image generated at step S112 above.

At step S116, the estimation section 32 finds the position (x, y) at which the absolute value of the correlation image is at a maximum based on the matching result obtained at step S114 above, and estimates that position as the amount of positional displacement of the subject vehicle measured by the positioning device 14.

At step S118, the estimation section 32 estimates the position of the subject vehicle based on the amount of positional displacement of the subject vehicle estimated at step S116 above and the positional information of the subject vehicle measured by the positioning device 14.

At step S120, the position of the subject vehicle estimated at step S118 above is output as the result, and the vehicle position estimation processing routine ended.

As explained above, the vehicle position estimation device of the first exemplary embodiment generates the environment image in which the three dimensional information of respective surrounding positions extracted from left and right images of in front of the vehicle are appended to positions corresponding to the surrounding positions in the generated road surface image, acquires, from the database, the stored image corresponding to the positional information of the subject vehicle based on the positional information of the subject vehicle, matches the generated environment image against the acquired stored image, and estimates the amount of displacement in the positional information of the subject vehicle based on the matching result obtained. The position of the subject vehicle can thereby be estimated with high precision.

Moreover, when the position of the subject vehicle is estimated, the position of the vehicle can be corrected even in an environment in which map matching is not possible using only road surface information as a clue.

Second Exemplary Embodiment

Next, explanation follows regarding a second exemplary embodiment. Note that portions configured similarly to those of the first exemplary embodiment are allocated the same reference numerals and explanation thereof is omitted.

The second exemplary embodiment differs from the first exemplary embodiment in that solid objects in the surroundings of the subject vehicle are detected based on an image acquired by the sensor information acquisition section 18, a pseudo-image representing the position and height of the solid objects on the road surface is generated, and an environment image is generated by appending the pseudo-image to the generated road surface image.

Figure 8:
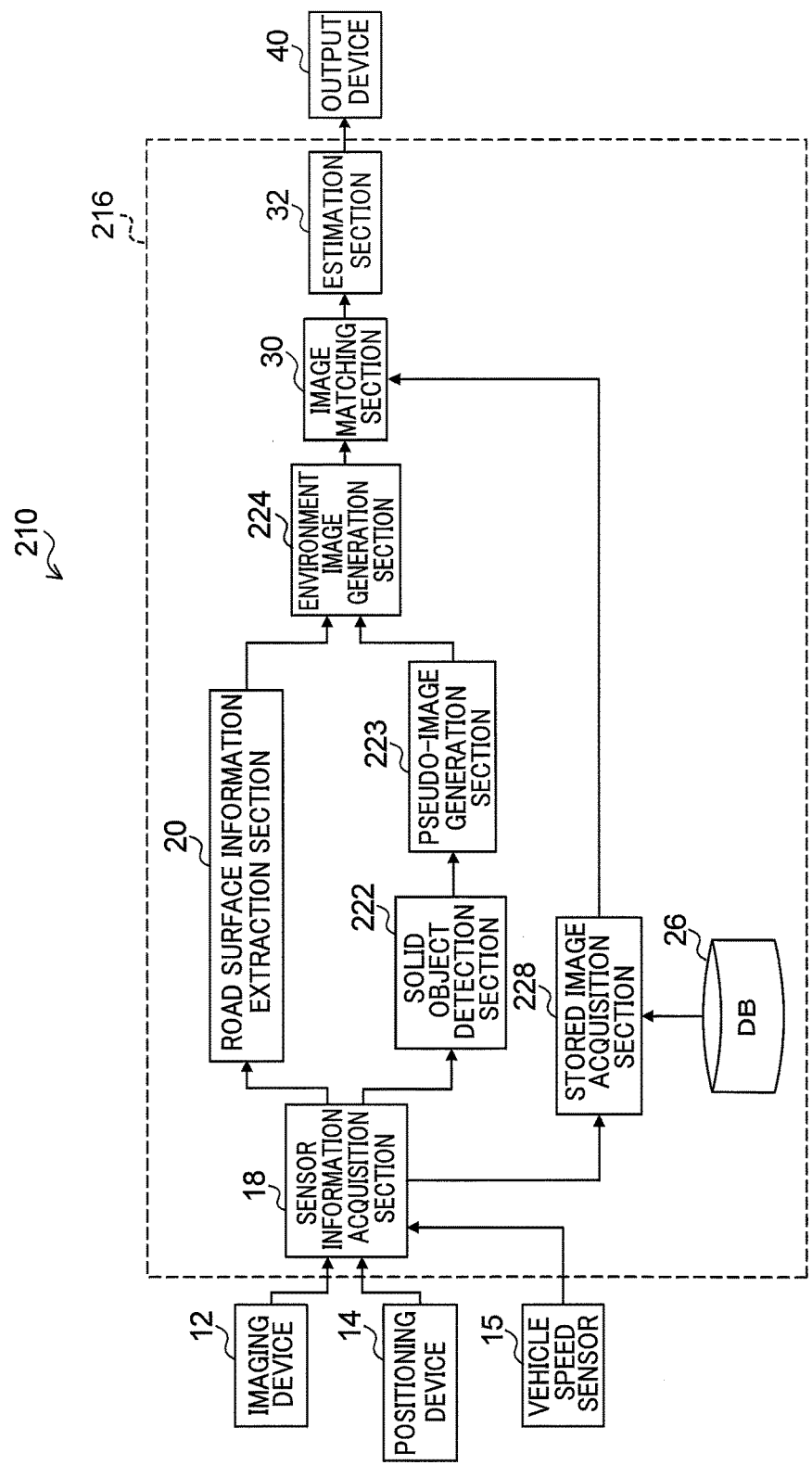
FIG. 8 is a block diagram illustrating a vehicle position estimation device according to a second exemplary embodiment.

Configuration of Vehicle Position Estimation Device 210 According to the Second Exemplary Embodiment As illustrated in FIG. 8, a computer 216 of a vehicle position estimation device 210 according to the second exemplary embodiment is configured including a CPU, RAM, ROM storing an program for executing a vehicle position estimation processing routine described below, and a bus connecting these together. When the computer 216 is explained using functional blocks divided by function implementation means on the basis of hardware and software, the computer 216 may be represented by a configuration including a sensor information acquisition section 18, a road surface information extraction section 20, a solid object detection section 222, a pseudo-image generation section 223, an environment image generation section 224, a database 26, a stored image acquisition section 228, an image matching section 30, and an estimation section 32.

The solid object detection section 222 detects solid objects in the surroundings of the subject vehicle in each of the left and right images acquired by the sensor information acquisition section 18. Extraction of the three dimensional information extracted by the three dimensional information extraction section 22 of the first exemplary embodiment is a method in which subjects are described using a grid; however, in the second exemplary embodiment, solid objects are detected explicitly.

More specifically, the solid object detection section 222 uses a Hough transform to extract edge lines from the respective left and right images acquired by the sensor information acquisition section 18, and extracts edge lines that configure solid objects, such as telegraph poles and pillar shaped objects, by extracting edge lines that are perpendicular to the road surface from among the extracted edge lines. Then, the solid object detection section 222 uses Equation (2) above to find the relative position between the subject vehicle and the solid object from the parallax in the edge lines extracted from the respective left and right image, and projects a point onto the grid. Note that employing the central value of the parallax on a line segment is effective when finding the parallax by line segment unit of the edge line segment. Features of solid objects such as pillar shaped objects are represented on the grid by recording the height of upper end points of the extracted edge lines.

As the three dimensional information of the surroundings of the subject vehicle, the pseudo-image generation section 223 generates a pseudo-image representing the positions and heights of solid objects on the road surface based on solid objects detected by the solid object detection section 222. Information regarding the solid objects is converted into an image format, and retained in the same format as the road surface image. Moreover, when performing matching processing between the environment image and the stored image, a pseudo-image is generated by processing similar to that for the stored image.

The pseudo-image generation section 223 may caricaturize pillar shaped objects amongst the solid objects into a simple graphic, such as "a circle centered on the base position thereof", and then embed the simple graphic in the pseudo-image. For other objects amongst the solid objects, the pseudo-image generation section 223 may draw guard rails, electrical lines, and the like in the image as line segment forms, may draw feature points and corner points in the image as circular forms, and may draw signage and billboard information in the pseudo-image as text or symbols.

Figure 9A:
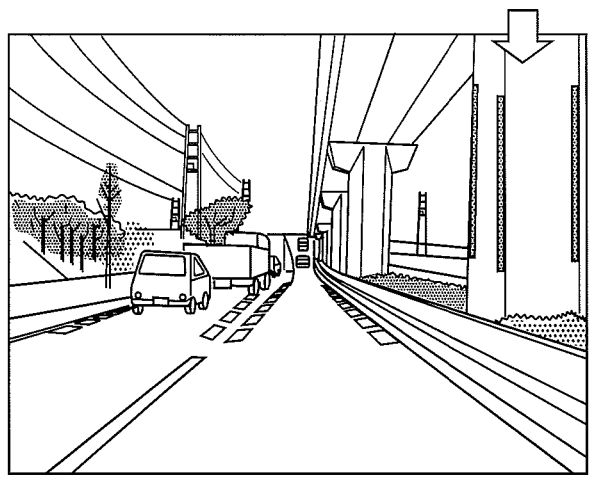
FIGS. 9A to 9C are diagrams for explaining processing to generate an environment image from a road surface image and a pseudo-image.
Figure 9B:
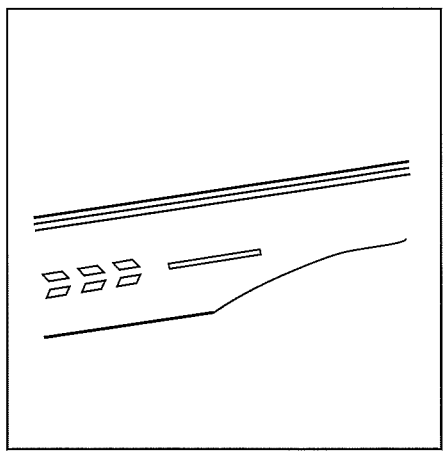
Figure 9C:
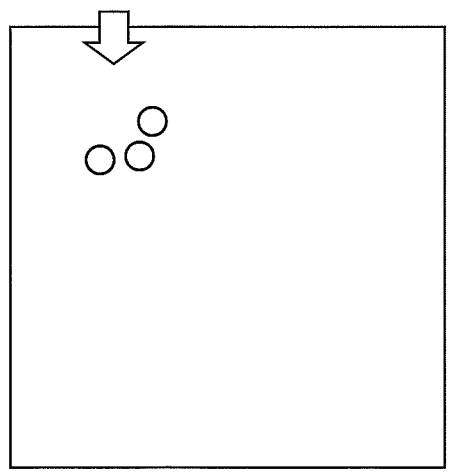

The environment image generation section 224 generates the environment image by appending the pseudo-image generated by the pseudo-image generation section 223 to the road surface image generated by the road surface information extraction section 20. FIGS. 9A to 9C illustrate diagrams for explaining processing that generates the environment image from the road surface image and the pseudo-image. As illustrated in FIGS. 9A to 9C, the environment image generation section 224 generates the environment image in a complex number format with the road surface image generated by the road surface information extraction section 20 as the real component of the environment image, and the pseudo-image generated by the pseudo-image generation section 223 as the imaginary component of the environment image. As illustrated in FIG. 9A and FIG. 9C, pillar shaped objects in the forward image are represented in the pseudo-image by "a circle centered on the base position thereof", and the pseudo-image is embedded as the imaginary component. Moreover, as illustrated in FIG. 9B, the road surface image generated by the road surface information extraction section 20 is embedded as the real component of the environment image.

The stored image acquisition section 228 acquires the stored image corresponding to the positional information of the subject vehicle from the database 26 based on the positional information of the subject vehicle acquired by the sensor information acquisition section 18.

The stored image acquisition section 228 acquires, for example, a square shaped area centered on the positional information of the subject vehicle acquired by the sensor information acquisition section 18 from the database 26 as the stored image corresponding to the positional information of the subject vehicle. Next, similarly to the pseudo-image generation section 223, the stored image acquisition section 228 generates a pseudo-image based on the three dimensional information pre-appended to the stored image. Then, as the stored image, the stored image acquisition section 228 acquires an image in a complex number format having the road surface image as the real component of the stored image and the pseudo-image of respective points in the road surface image as the imaginary component of the stored image.

Note that other configuration of the vehicle position estimation device according to the second exemplary embodiment are similar to those of the first exemplary embodiment, and explanation thereof is therefore omitted.

Figure 10:
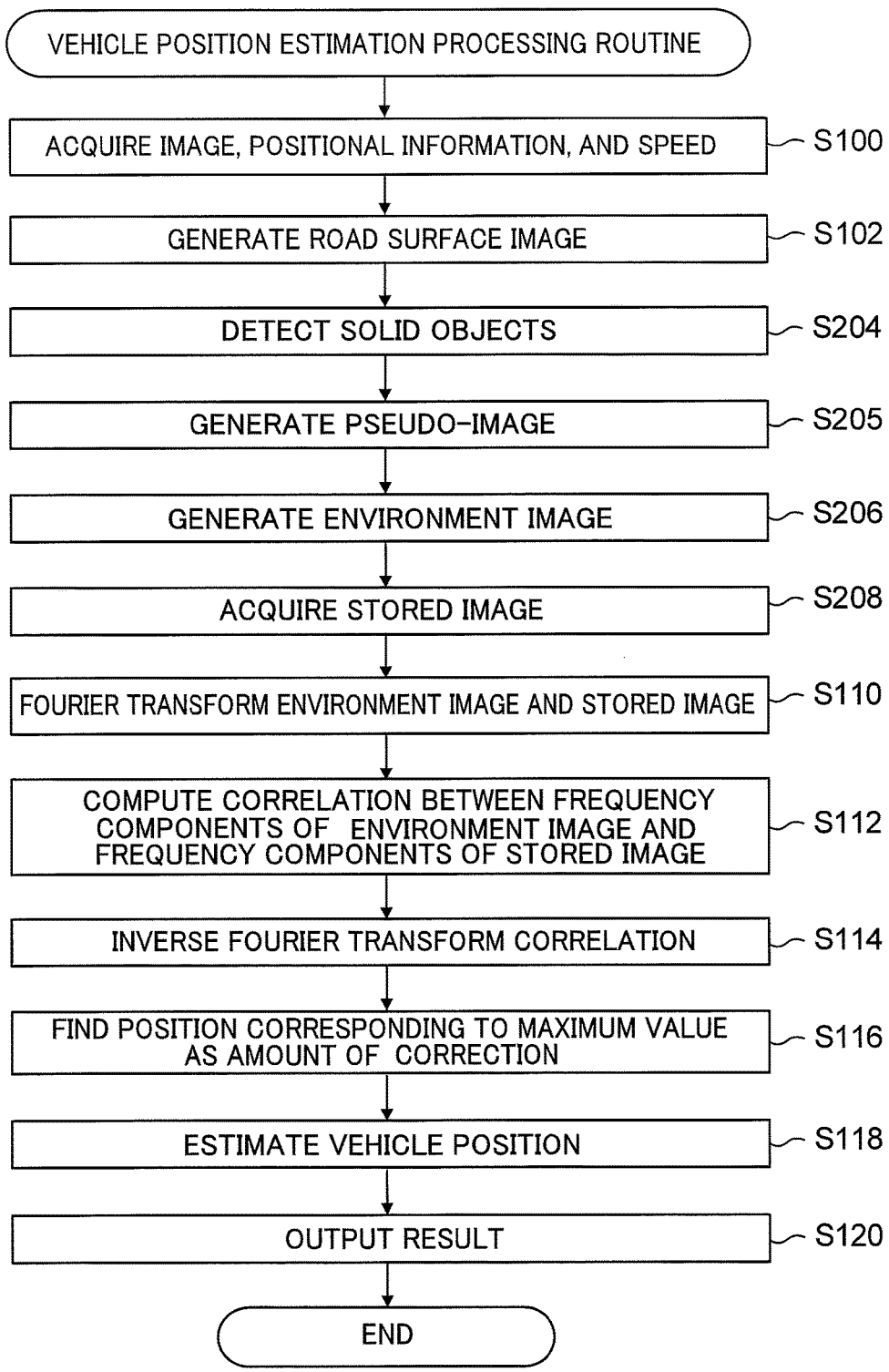
FIG. 10 is a flowchart illustrating contents of a vehicle position estimation processing routine of a vehicle position estimation device according to the second exemplary embodiment.

Operation of Vehicle Position Estimation Device 210 According to the Second Exemplary Embodiment Next, explanation follows regarding operation of the vehicle position estimation device 210 according to the second exemplary embodiment. First, when the imaging device 12 starts capturing images in front of the subject vehicle, the vehicle position estimation processing routine illustrated in FIG. 10 is repeatedly executed in the computer 216.

At step S204, the solid object detection section 222 detects solid objects in the surroundings of the subject vehicle in the respective left and right images acquired at step S100.

At step S205, as the three dimensional information of the surroundings of the subject vehicle, the pseudo-image generation section 223 generates a pseudo-image that represents the position and height of the solid objects on the road surface based on the solid objects detected at step S204 above.

At step S206, the environment image generation section 224 generates the environment image by appending the pseudo-image generated at step S205 above to the road surface image generated at step S102.

At step S208, the stored image acquisition section 228 acquires the stored image corresponding to the positional information of the subject vehicle from the database 26 based on the positional information of the subject vehicle acquired at step S100, and generates the pseudo-image based on the three dimensional information pre-appended to the stored image. Then, as the stored image, the stored image acquisition section 228 acquires an image in complex number format having the road surface image as the real component of the stored image, and the pseudo-image of respective points in the road surface image as the imaginary component of the stored image.

Note that the configuration and operation of the vehicle position estimation device according to the second exemplary embodiment are similar to those of the first exemplary embodiment, and explanation thereof is therefore omitted.

As explained above, the vehicle position estimation device of the second exemplary embodiment detects solid objects in the surroundings of the subject vehicle in the respective left and right images of in front of the vehicle, and, as the three dimensional information of the surroundings of the subject vehicle, generates a pseudo-image representing the position and height of the solid objects on the road surface based on the detected solid objects, generates an environment image by appending the pseudo-image to the generated road surface image, matches the generated environment image against the acquired stored image, and estimates the amount of displacement in the positional information of the subject vehicle based on the obtained matching result. The position of the subject vehicle can thereby be estimated with high precision.

Moreover, correction of the front-rear direction position is often difficult since, when the position of the subject vehicle is corrected using the road surface information, the road surface information is biased toward the straight line components parallel to the travelling direction, such as lane markings. However, the vehicle position estimation device of the second exemplary embodiment detects solid objects such as telegraph poles, deliberately amplifies the information necessary for correcting front-rear positional displacement of the vehicle by emphasizing the presence of the detected solid objects through caricaturization, and can align the position of the subject vehicle with heighted precision. Due to only employing the positional information (for example, points), without amplifying the information necessary for correcting front-rear positional displacement of the vehicle, amplifying the information necessary for correcting front-rear positional displacement of the vehicle is effective due to the feature amounts being small compared to the road surface information.

Third Exemplary Embodiment

Next, explanation follows regarding a third exemplary embodiment. Note that portions configured similarly to those of the first or second exemplary embodiment are allocated the same reference numerals and explanation thereof is omitted.

The third exemplary embodiment differs from the first and second exemplary embodiment in that it further includes a laser radar that acquires surrounding information including three dimensional information of respective surrounding positions of the subject vehicle, and in that the imaging device is a single camera.

Figure 11:
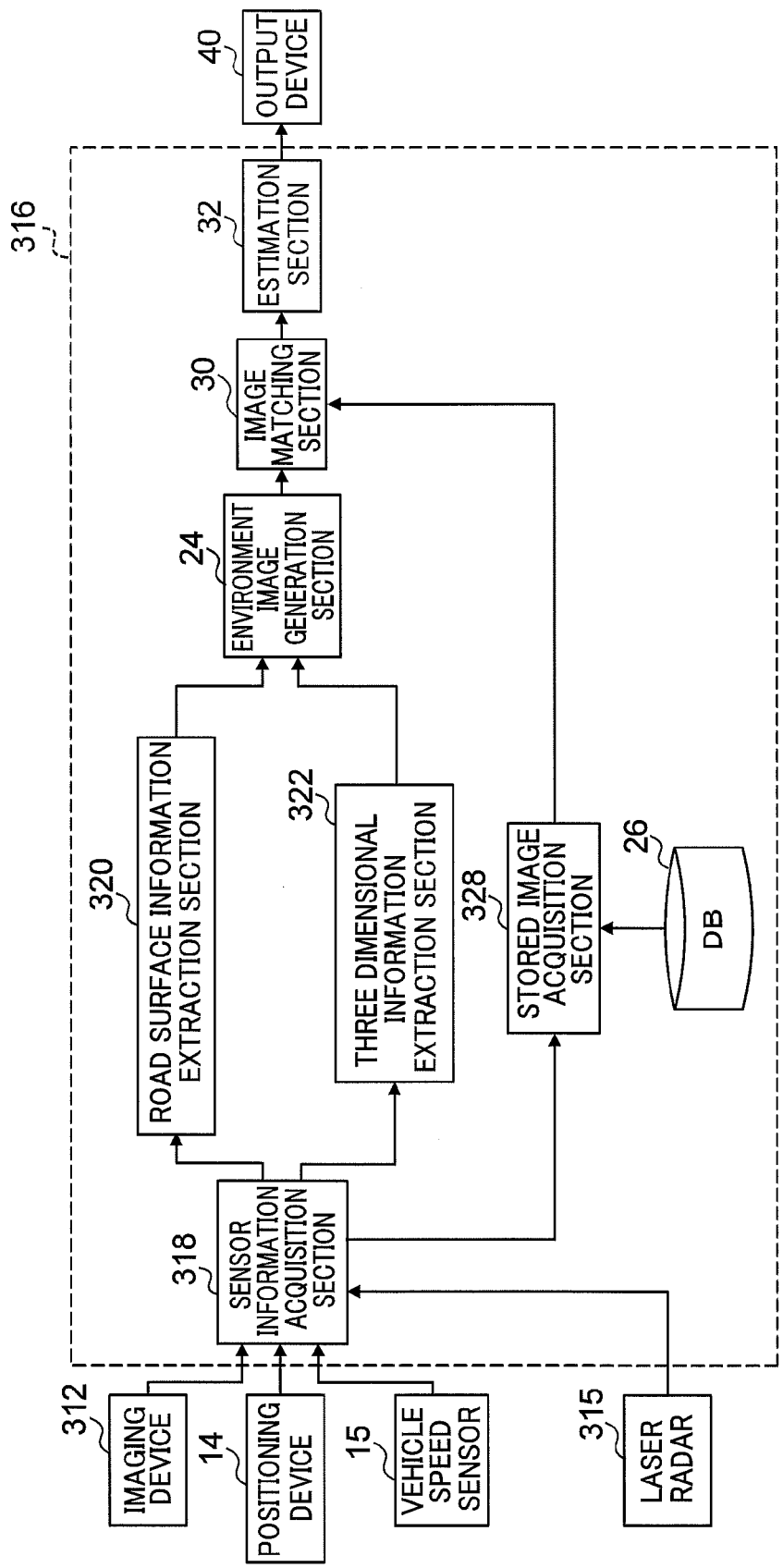
FIG. 11 is a block diagram of a vehicle position estimation device according to a third exemplary embodiment.

Configuration of Vehicle Position Estimation Device 310 According to the Third Exemplary Embodiment As illustrated in FIG. 11, a vehicle position estimation device 310 according to the third exemplary embodiment is configured including an imaging device 312 that captures and outputs images of rearward of the subject vehicle including a roadway region, a positioning device 14 that measures positional information of the subject vehicle, a vehicle speed sensor 15 that measures the speed of the subject vehicle, a laser radar 315 that acquires surrounding information including three dimensional information of respective surrounding positions of the subject vehicle, a computer 316 that executes processing to estimate the position of the subject vehicle based on the images obtained from the imaging device 12 of the subject vehicle, the positional information obtained from the positioning device 14, and the surrounding information obtained from the laser radar 315, and an output device 40 that outputs the positional information of the subject vehicle estimated by the computer 316.

The imaging device 312 is mounted to the vehicle, successively captures images of rearward of the subject vehicle, including a roadway region, and outputs images of rearward of the subject vehicle. In the third exemplary embodiment, explanation follows regarding an example of a case in which the imaging device 312 is configured using a single camera. The imaging device 312 is configured using, for example, a camera for rearward monitoring of rearward of the vehicle, and outputs captured images. The imaging device 312 captures images of rearward of the subject vehicle, and includes two imaging sections (not illustrated in the drawings) that generate image signals of images, an A/D converter (not illustrated in the drawings) that A/D converts image signals generated by the two imaging sections, and image memory (not illustrated in the drawings) for temporarily storing A/D converted image signals.

The laser radar 315 is mounted to the vehicle, and acquires surrounding information including three dimensional information of respective surrounding positions of the subject vehicle. Note that the laser radar 315 is installed to the rear of the vehicle similarly to the imaging device 312. The laser radar 315 is configured including a light emitting section and a light receiving section, performs distance measurements by measuring the time of flight (TOF) taken for laser light emitted by the light emitting section to be reflected by a target object and then detected by the light receiving section, and acquires surrounding information including three dimensional information of respective surrounding positions of the subject vehicle.

The computer 316 is configured including a CPU, RAM, ROM storing a program for executing a vehicle position estimation processing routine, and a bus connecting these together. When the computer 316 is explained using functional blocks divided by function implementation means on the basis of hardware and software, the computer 316 may be represented by a configuration including a sensor information acquisition section 318, a road surface information extraction section 320, a three dimensional information extraction section 322, an environment image generation section 24, a database 26, a stored image acquisition section 328, an image matching section 30, and an estimation section 32. Note that the sensor information acquisition section 318 is an example of an information acquisition unit.

The sensor information acquisition section 318 acquires a rearward image captured by the imaging device 312. Moreover, the sensor information acquisition section 318 acquires positional information of the subject vehicle measured by the positioning device 14, and the speed of the subject vehicle measured by the vehicle speed sensor 15. Moreover, the sensor information acquisition section 318 acquires surrounding information including the three dimensional information of respective surrounding positions of the subject vehicle acquired by the laser radar 315.

The road surface information extraction section 320 generates a road surface image in which the image acquired by the sensor information acquisition section 318 is projected onto the road surface on which the subject vehicle is travelling. Specifically, as illustrated in FIG. 2, the road surface information extraction section 320 converts coordinates of the image captured by the imaging device 312 to generate the road surface image, similarly to in the first exemplary embodiment.

Based on the surrounding information acquired by the sensor information acquisition section 318, the three dimensional information extraction section 322 records the three dimensional information of the respective surrounding positions of the subject vehicle acquired by the laser radar 315 in a grid format, similarly to in the first exemplary embodiment.

The stored image acquisition section 328 acquires the stored image corresponding to the positional information of the subject vehicle from the database 26 based on the positional information of the subject vehicle acquired by the sensor information acquisition section 318. The stored image acquisition section 328 acquires a region rearward of the position of the vehicle from the database 26 as the stored image corresponding to the positional information of the subject vehicle, since the road surface image generated by the road surface information extraction section 320 and the three dimensional information acquired by the three dimensional information extraction section 322 are information for rearward of the vehicle.

Note that the configuration and operation of the vehicle position estimation device according to the third exemplary embodiment is similar to that of the first exemplary embodiment, and explanation thereof is therefore omitted.

As explained above, the vehicle position estimation device of the third exemplary embodiment generates the environment image in which the three dimensional information of the respective surrounding positions included in the surrounding information of the vehicle acquired by the laser radar have been appended to the positions corresponding to the surrounding positions in the generated road surface image, acquires the stored image corresponding to the positional information of the subject vehicle from the database based on the positional information of the subject vehicle, matches the generated environment image against the acquired stored image, and estimates the amount of displacement in the positional information of the subject vehicle based on the obtained matching result. The position of the subject vehicle can thereby be estimated with high precision.

Fourth Exemplary Embodiment

Next, explanation follows regarding a fourth exemplary embodiment. Note that portions configured similarly to those of the first to the third exemplary embodiments are allocated the same reference numerals, and explanation thereof is omitted.

The fourth exemplary embodiment differs from the first to third exemplary embodiments in that a vehicle position acquisition section 429 is also provided.

Figure 12:
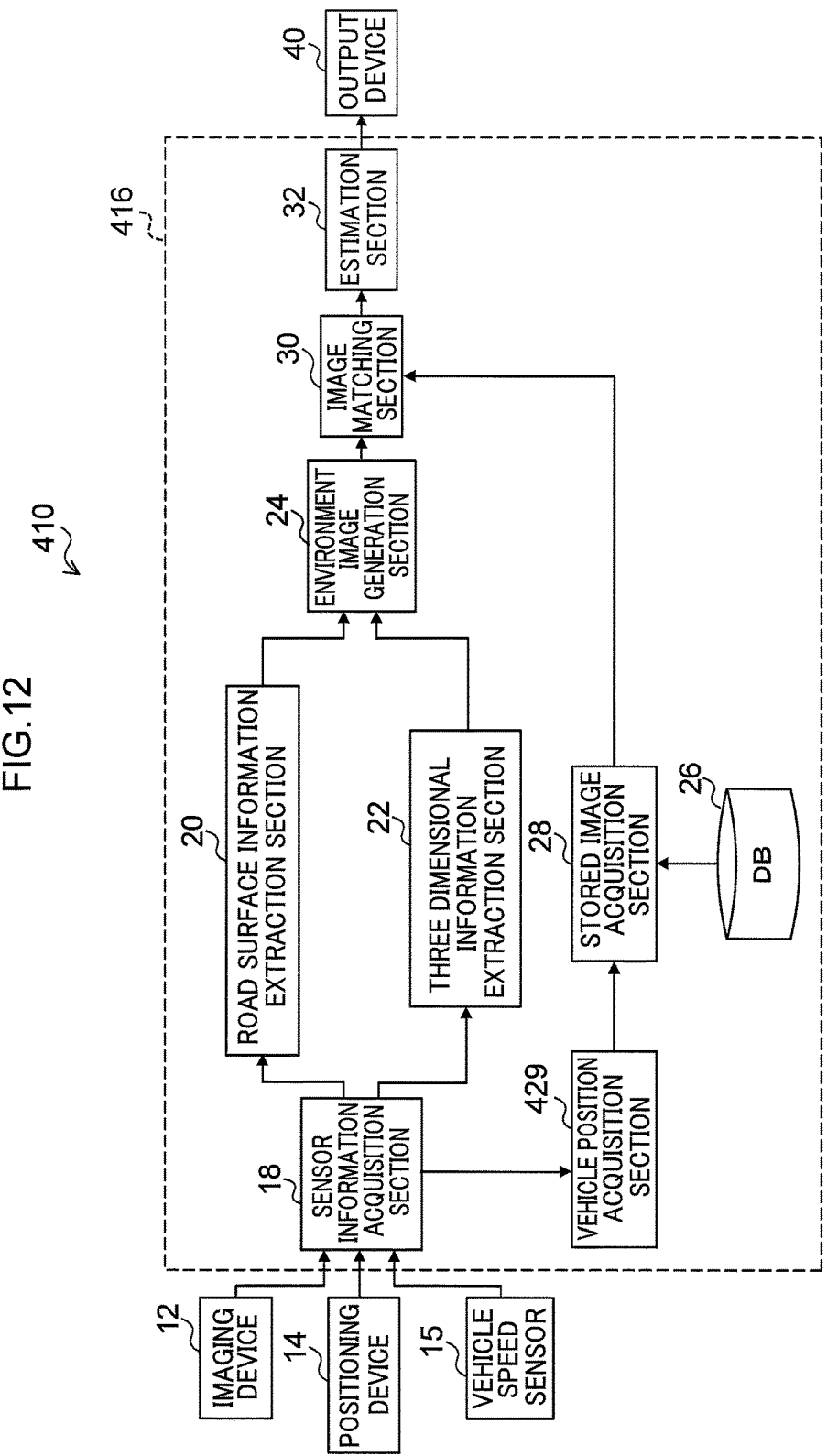
FIG. 12 is a block diagram illustrating a vehicle position estimation device according to a fourth exemplary embodiment.

Configuration of Vehicle Position Estimation Device 410 According to the Fourth Exemplary Embodiment As illustrated in FIG. 12, a computer 416 of a vehicle position estimation device 410 according to the fourth exemplary embodiment is configured including a CPU, RAM, ROM storing a program for executing a vehicle position estimation processing routine, and a bus connecting these together. When the computer 416 is explained using functional blocks divided by function implementation means on the basis of hardware and software, the computer 16 may be represented by a configuration including a sensor information acquisition section 18, a road surface information extraction section 20, a three dimensional information extraction section 22, an environment image generation section 24, a database 26, a stored image acquisition section 28, an image matching section 30, a estimation section 32, and a vehicle position acquisition section 429.

The vehicle position acquisition section 429 estimates the position of the subject vehicle based on positional information of the subject vehicle acquired by the sensor information acquisition section 18 and the speed of the subject vehicle, and outputs the estimation result to the stored image acquisition section 28. The vehicle position acquisition section 429 may, for example, employ trajectory precision enhancing technology employing vehicle speed pulses (see Reference Document 5 (J. Meguro, Y. Kojima, N. Suzuki, and E. Teramoto, "Automotive positioning based on bundle adjustment of GPS raw data and vehicle trajectory", Proceedings of the International Technical Meeting of The Satellite Division of the Institute of Navigation, p. 1005-1010, Portland, Oreg., September 2011)).

For example, the vehicle position acquisition section 429 estimates the trajectory of the subject vehicle from trajectory information of GPS satellites included in the positional information and the speed of the subject vehicle, based on the positional information of the subject vehicle and the speed of the subject vehicle acquired by the sensor information acquisition section 18, and estimates the position of the subject vehicle based on the estimated trajectory of the subject vehicle.

Note that the configuration and operation of the vehicle position estimation device according to the fourth exemplary embodiment are similar to those of the first exemplary embodiment, and explanation thereof is therefore omitted.

As explained above, the vehicle position estimation device of the fourth exemplary embodiment estimates the amount of displacement in the positional information of the subject vehicle after the vehicle position acquisition section 429 estimates the position of the subject vehicle. The position of the subject vehicle can thereby be estimated with high precision.

Moreover, although explanation has been given in the second exemplary embodiment of an example in which the stored image acquisition section 228 generates the pseudo-image based on the three dimensional information pre-appended to the stored image similarly to the pseudo-image generation section 223, there is no limitation thereto. For example, a stored image that is a road surface image, corresponding to respective positional information of the vehicle, in which pseudo-images are appended to respective positions, may be stored in the database 26 in advance, and the stored image acquisition section 228 may acquire the stored image corresponding to the positional information of the subject vehicle from the database 26 based on the positional information of the subject vehicle acquired by the sensor information acquisition section 18 and acquire, as the stored image, an image in a complex number format, in which the road surface image is the real component of the stored image, and the pseudo-image of respective points in the road surface image is the imaginary component of the stored image.

Moreover, although explanation has been given in the third exemplary embodiment of an example in which the environment image is generated based on the image obtained by the single camera and the surrounding information obtained from the laser radar, there is no limitation thereto, and the environment image may be generated based on the surrounding information obtained from the laser radar alone.

Moreover, although explanation has been given in the third exemplary embodiment of an example in which the imaging device 312 and the laser radar 315 are installed at the rear of the subject vehicle, there is no limitation thereto, and the imaging device 312 and the laser radar 315 may be installed at the front of the subject vehicle.

Moreover, explanation has been given in the exemplary embodiments above of examples in which the environment image is generated in a complex number format having the generated road surface image as the real component of the environment image and the height of respective points in the road surface image (or the pseudo-image) as the imaginary component of the environment image, and for the stored image, the stored image is acquired in a complex number format having the road surface image as the real component of the stored image and the height of respective points in the road surface image (or the pseudo-image) as the imaginary component of the stored image; however, there is no limitation thereto. For example, the environment image may be generated in a complex number format having the generated road surface image as the imaginary component of the environment image and the height of respective points in the road surface image (or the pseudo-image) as the real component of the environment image, and for the stored image, the stored image may be acquired in a complex number format having the road surface image as the imaginary component of the stored image and the height of respective points in the road surface image (or the pseudo-image) as the real component of the stored image.

Moreover, although explanation has been given in the present specification regarding exemplary embodiments in which a program is pre-installed, the program may be provided stored on a computer readable recording medium, or may be provided over a network. Moreover, each section of the vehicle position estimation device of the exemplary embodiments may be configured by hardware.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle position estimation device, comprising:
a processor programmed to:
acquire surrounding information including three dimensional information of respective surrounding positions of a subject vehicle, and acquire positional information of the subject vehicle;
detect solid objects in surroundings of the subject vehicle based on the acquired surrounding information;
as three dimensional information of the surroundings of the subject vehicle, generate a pseudo-image representing positions and heights of the solid objects on a road surface based on the detected solid objects;
generate a road surface image in which the acquired surrounding information is projected onto the road surface along which the subject vehicle is travelling;
generate an environment image in which the three dimensional information of the respective surrounding positions included in the surrounding information has been appended to positions corresponding to the surrounding positions in the generated road surface image, including appending the generated pseudo-image to the generated road surface image;
based on the acquired positional information of the subject vehicle, acquire a stored image corresponding to the positional information of the subject vehicle from a database in which stored images, that are road surface images corresponding to respective items of positional information of a vehicle and that are road surface images to which three dimensional information has been appended to respective positions, are pre-stored;
calculate a match the generated environment image with the acquired stored image; and
estimate an amount of displacement in the positional information of the subject vehicle based on the calculated matching result.

2. The vehicle position estimation device of claim 1, wherein:
the processor generates the environment image in a complex number format having the generated road surface image as a real component of the environment image, and the three dimensional information as an imaginary component of the environment image;
the processor acquires the stored image corresponding to the positional information of the subject vehicle from the database, in which the stored images are stored in a complex number format having a road surface image as a real component of the stored images and three dimensional information of the respective positions as an imaginary component of the stored images;
the processor performs frequency conversion on each of the generated environment image and the acquired stored image, and matches the environment image with the stored image by calculating a correlation between a frequency component of the environment image and a frequency components of the stored image; and
the processor estimates the amount of displacement in the positional information of the subject vehicle based on the calculated correlation.

3. The vehicle position estimation device of claim 1, wherein:
the processor generates the environment image in a complex number format having the generated road surface image as an imaginary component of the environment image, and the three dimensional information as a real component of the environment image;
the processor acquires the stored image corresponding to the positional information of the subject vehicle from the database, in which the stored images are stored in a complex number format having the road surface image as an imaginary component of the stored images, and the three dimensional information of the respective positions as a real component of the stored images;
the processor performs frequency conversion on each of the generated environment image and the acquired stored image, and matches the environment image with the stored image by calculating a correlation between a frequency component of the environment image and a frequency component of the stored image; and
the processor estimates the amount of displacement in the positional information of the subject vehicle based on the calculated correlation.

4. A vehicle position estimation method comprising:
acquiring surrounding information including three dimensional information of respective surrounding positions of a subject vehicle, and acquiring positional information of the subject vehicle;
detecting solid objects in surroundings of the subject vehicle based on the acquired surrounding information;
as three dimensional information of the surroundings of the subject vehicle, generating a pseudo-image representing positions and heights of the solid objects on a road surface based on the detected solid objects;
generating a road surface image in which the acquired surrounding information is projected onto the road surface on which the subject vehicle is travelling;
generating an environment image in which the three dimensional information of the respective surrounding positions included in the surrounding information has been appended to positions corresponding to the surrounding positions in the generated road surface image, including appending the generated pseudo-image to the generated road surface image;
based on the acquired positional information of the subject vehicle, acquiring the stored image corresponding to the positional information of the subject vehicle from a database in which stored images, that are road surface images corresponding to respective items of positional information of a vehicle and that are road surface images to which three dimensional information has been appended to respective positions, are pre-stored;
matching the generated environment image with the acquired stored image; and
estimating an amount of displacement in the positional information of the subject vehicle based on an obtained matching result.

5. A non-transitory computer readable medium storing a program causing a computer to execute a process for vehicle position estimation, the process comprising:
acquiring surrounding information including three dimensional information of respective surrounding positions of a subject vehicle, and acquiring positional information of the subject vehicle;
detecting solid objects in surroundings of the subject vehicle based on the acquired surrounding information;
as three dimensional information of the surroundings of the subject vehicle, generating a pseudo-image representing positions and heights of the solid objects on a road surface based on the detected solid objects;

generating a road surface image in which the acquired surrounding information is projected onto the road surface on which the subject vehicle is travelling;

generating an environment image in which the three dimensional information of the respective surrounding positions included in the surrounding information has been appended to positions corresponding to the surrounding positions in the generated road surface image, including appending the generated pseudo-image to the generated road surface image;

based on the acquired positional information of the subject vehicle, acquiring the stored image corresponding to the positional information of the subject vehicle from a database in which stored images, that are road surface images corresponding to respective items of positional information of a vehicle and that are road surface images to which three dimensional information has been appended to respective positions, are pre-stored;

matching the generated environment image with the acquired stored image; and estimating an amount of displacement in the positional information of the subject vehicle based on an obtained matching result.

* * * * *